US006933877B1

(12) United States Patent
Halladay et al.

(10) Patent No.: US 6,933,877 B1
(45) Date of Patent: Aug. 23, 2005

(54) MULTIPLE-ANTENNA JAMMING SYSTEM

(75) Inventors: Ralph H. Halladay, Huntsville, AL (US); Michael R. Christian, Owens Cross Roads, AL (US); Donald E. Lovelace, Hunstville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 23 days.

(21) Appl. No.: 10/768,745

(22) Filed: Jan. 29, 2004

(51) Int. Cl.$^7$ ............ G01S 7/38; H04K 3/00; F42B 15/01
(52) U.S. Cl. ............ 342/14; 342/13; 342/61; 342/62; 342/63; 342/175; 342/195; 455/1; 244/3.1; 244/3.15; 244/3.19
(58) Field of Search ............ 342/1–20, 61–68, 342/175, 195; 244/3.1–3.3; 455/1; 89/1.11

(56) References Cited

U.S. PATENT DOCUMENTS

| | | | | |
|---|---|---|---|---|
| 3,852,747 A | * | 12/1974 | Morand | 342/15 |
| 4,241,889 A | * | 12/1980 | Schwellinger et al. | 244/3.15 |
| 5,018,685 A | * | 5/1991 | Meuron et al. | 244/3.14 |
| 5,061,930 A | * | 10/1991 | Nathanson et al. | 342/13 |
| 5,157,401 A | * | 10/1992 | Doucet | 342/14 |
| 6,424,286 B1 | * | 7/2002 | Smith et al. | 342/14 |

* cited by examiner

Primary Examiner—Bernarr E. Gregory
(74) Attorney, Agent, or Firm—Hay Kyung Chang

(57) ABSTRACT

The Multiple-Antenna Jamming System (MAJS) is useful for missile-borne jamming of active protection system radars that operate in close proximity to the frequency band of the missile's radio frequency seeker. The MAJS utilizes multiple receiving and transmitting antennas to reduce shadowing effects due to the transmissive radome. It also channelizes the jamming signals into in-seeker-band and out-of-seeker band signals to synchronize the transmission of jamming signals with the emit-listen pattern of the missile seeker and to eliminate the problem of de-sensitizing the RF seeker from the jammer energy. The in-seeker-band jamming signals are transmitted only concurrently with the missile seeker emissions and any signals emanating from an enemy radar are received only during the listen mode of the missile seeker.

15 Claims, 6 Drawing Sheets

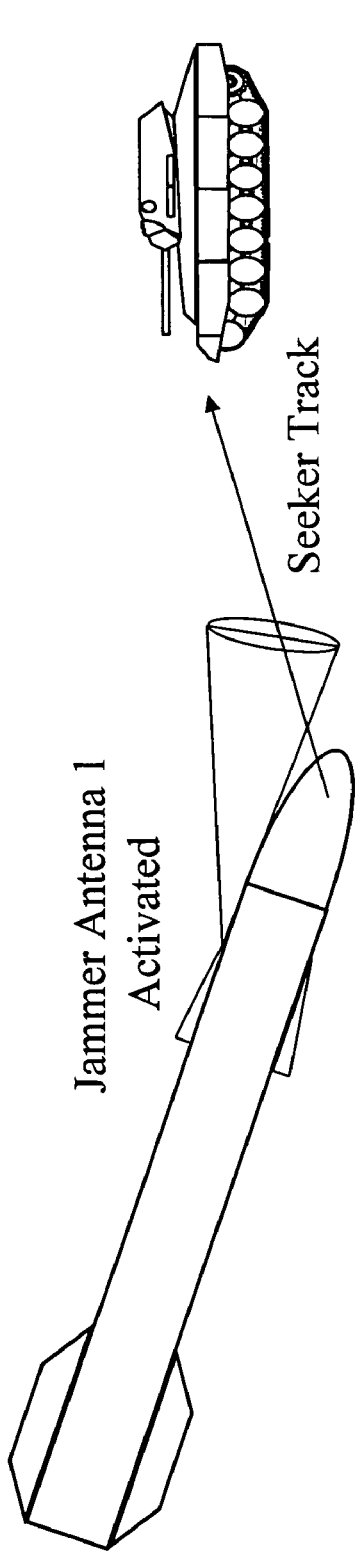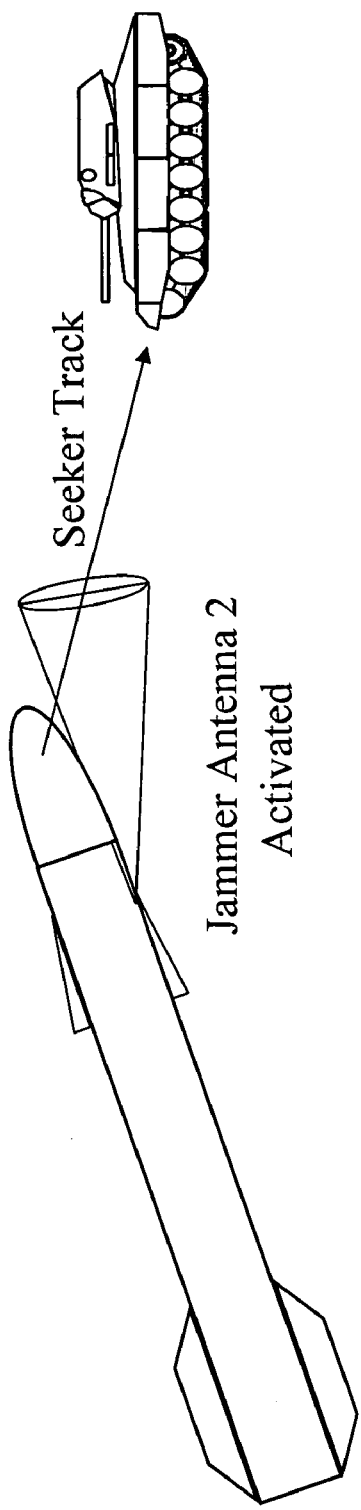
Figure 5A
Figure 5B

MULTIPLE-ANTENNA JAMMING SYSTEM

DEDICATORY CLAUSE

The invention described herein may be manufactured, used and licensed by or for the Government for governmental purposes without the payment to us of any royalties thereon.

BACKGROUND OF THE INVENTION

Active Protection Systems (APS) are small air defense systems that provide protection for ground vehicles such as tanks against anti-tank guided missiles (ATGMs) and rocket propelled grenades (RPGs). Therefore, APS present a potential threat to the effective lethality of anti-armor missiles. To counteract the APS, missile-borne counter-active protection system (CAPS) jammers have been developed. The aim of such jammers is to disable the APS fire control radar so that the targeted ground vehicle remains vulnerable to the missile attack. A representative architecture of a CAPS jammer is depicted in FIG. 1. In a typical operation mode, any emissions from APS enemy radar are monitored by receiving antenna 101 in conjunction with activity detector 103. When such emissions are intercepted, indicating the presence of an enemy radar, then jamming signal is generated by jammer techniques generator 107 and amplified to a high level in transmitter amplifier 109 and subsequently radiated toward the enemy radar to disable the enemy radar. The functions of the generator and amplifier are controlled by jammer controller 105. The jamming signal is intended to interfere with the enemy radar's reception of its own signal being reflected from the surface of the incoming missile. With successful interference, the enemy radar is rendered incapable of accurately tracking the missile and initiating the destruction of the missile before it can strike the target vehicle.

A counter-active protection system jammer has been developed that utilizes conformal end-fire (surface wave) antennas on the exterior of the missile and the electronics already within the missile. With this jammer on board, the seeker missile homes on the selected target while simultaneously jamming the enemy radar. The jamming process, however, presents several problems when the seeker employed by the missile is an active radio-frequency (RF) seeker. The problems are particularly acute when the frequencies of the jamming signals are very close to the operating band of the RF seeker itself.

One problem is that the conformal antennas do not function well on a missile that has a transmissive radome in front of the seeker to protect the seeker hardware. Normally, in the absence of a radome, the conformal antennas used in the CAPS create radio frequency currents on the missile's conductive skin that propagate forward. These propagated currents eventually are launched into the air as radiated emissions at the front of the missile. With an electrically conductive front-end of the missile (i.e. without the transmissive radome), the radiated energy is present even on the side opposite from where the antennas are located since some of the RF current does not become launched until it has traveled around the nose of the missile to the other side. In a sense, the surface wave covering both sides of the missile makes the entire front-end of the missile an antenna.

However, when a transmissive radome covers the seeker at the front-end of missile 201, the radome, not being electrically conductive, does not support the wave propagation to the other side of the missile. What results is antenna pattern shadow on that side. Antenna pattern shadowing is a significant problem because the angle between the missile body and the line of sight to the target may be up to +/−20 degrees due to the flight trajectory of the missile. This effect is illustrated in FIGS. 2 and 3. This means that if the required jamming spatial angle is greater than the coverage angle of the transmitting antenna, the likelihood of successful jamming of the enemy radar is very low, with a corresponding increase in the likelihood of successful tracking of the missile by the enemy radar.

Another significant problem occurs when the jamming signals interfere with the seeker signals. Most RF seekers on missiles employ pulse Doppler radars. In a pulse Doppler radar, a transmit pulse is radiated followed by an interval for receiving. The receiving (or listening) interval is followed by another transmit pulse. This sequence is repeated. Therefore, the seeker is never transmitting and receiving simultaneously. The interference between the jammer and the seeker can occur when the transmit pulses from the seeker (or skin reflections of the transmit pulses) are confused with emission from the enemy radar, or when the jammer energy jams the seeker. Such confusion and unintentional jamming can occur if the enemy radar, jammer and the missile seeker all emit signals in the same or close frequency band. The false signals may set off the detector and jammer in the missile to no useful purpose. Further, the transmit pulse from the seeker can cause power-handling difficulties for the jammer since they have the potential to overdrive the activity detector.

Yet a third problem occurs when the jammer energy enters the seeker receiver through the seeker antenna backlobes and raises the interference level to such that the seeker receiver's minimum detectable signal required for function is increased. Such desensitization of the seeker receiver greatly decreases the seeker effectiveness with corresponding reduction in the target detection range and tracking accuracy.

SUMMARY OF THE INVENTION

The Multiple-Antenna Jamming System (MAJS) solves the above-described problems and many others by utilizing more than one each receiving antenna and transmitting antenna, and incorporating a means for synchronizing the emission sequence of the jammer with the emission sequence of the seeker so that any jamming signals that are in the in-seeker-band are not emitted simultaneously with the seeker signals. The Jamming System uses information relative to the missile's line-of-sight to the target and the associated enemy radar to select and use the receiving and transmitting antennas that are most advantageously positioned to maximize the effectiveness of the Jamming System.

DESCRIPTION OF THE DRAWING

FIGS. 5A and 5B illustrate the selection of a particular transmit antenna, among multiple transmit antennas, to maximize the jamming effect.

DESCRIPTION OF THE PREFERRED EMBODIMENT

Figure 1:
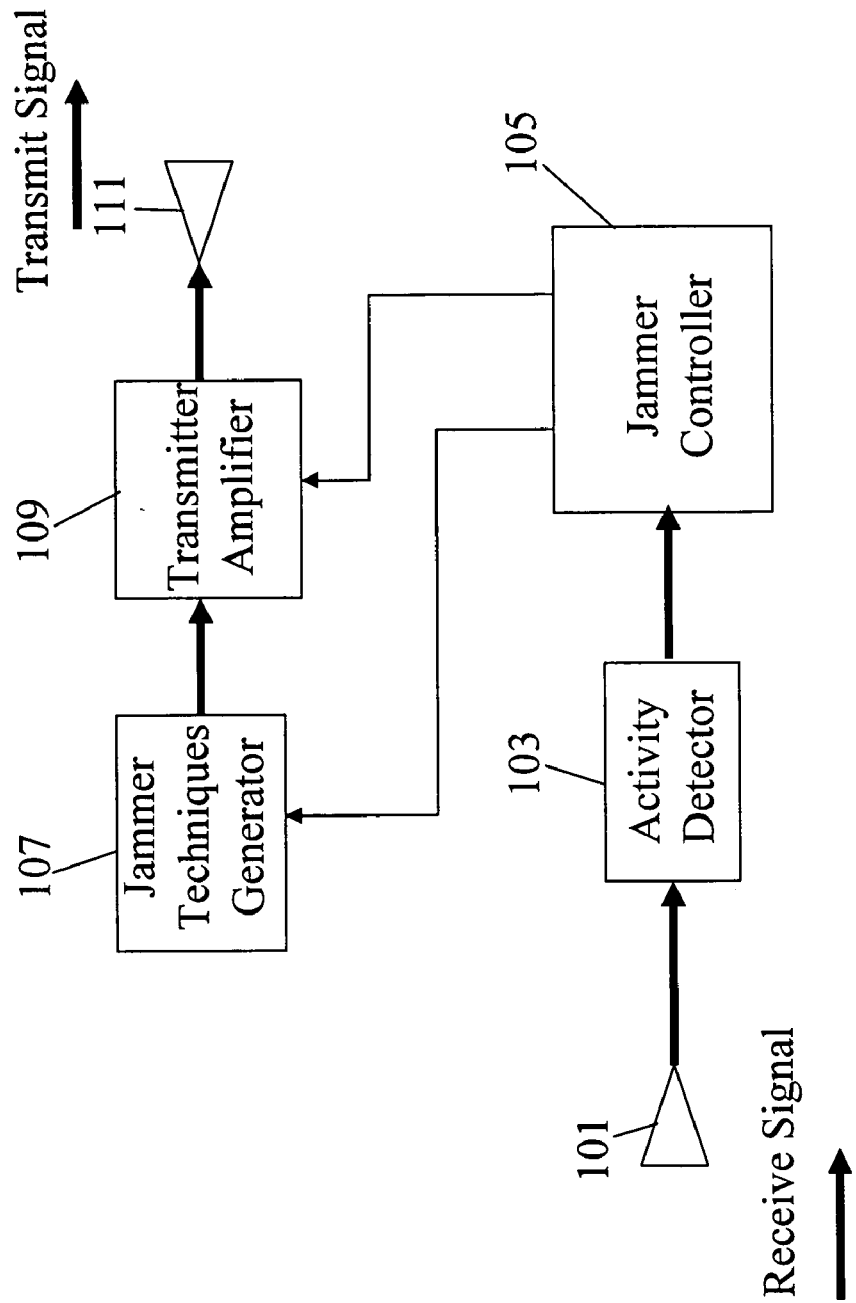
FIG. 1 depicts a representative architecture of a typical counter-active protection system jammer.
Figure 2:
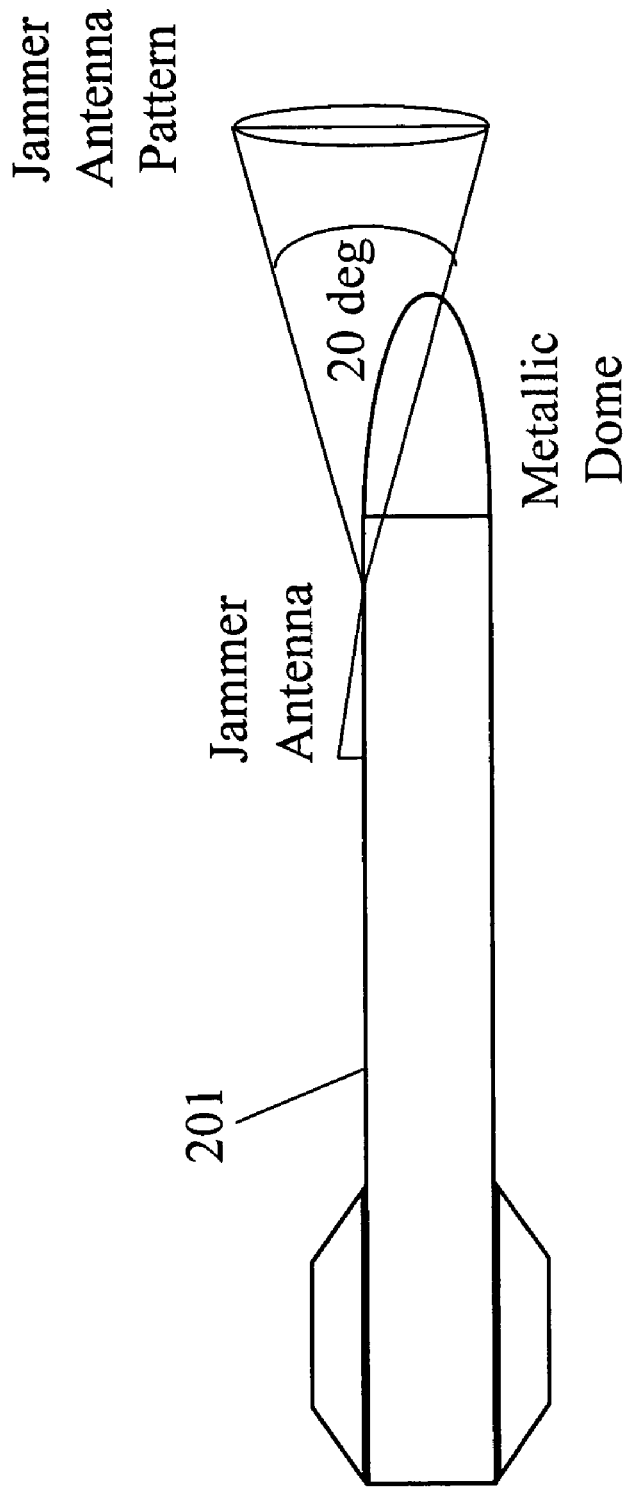
FIG. 2 illustrates the effect of surface wave propagation of the RF current on a missile that has no transmissive radome.
Figure 3:
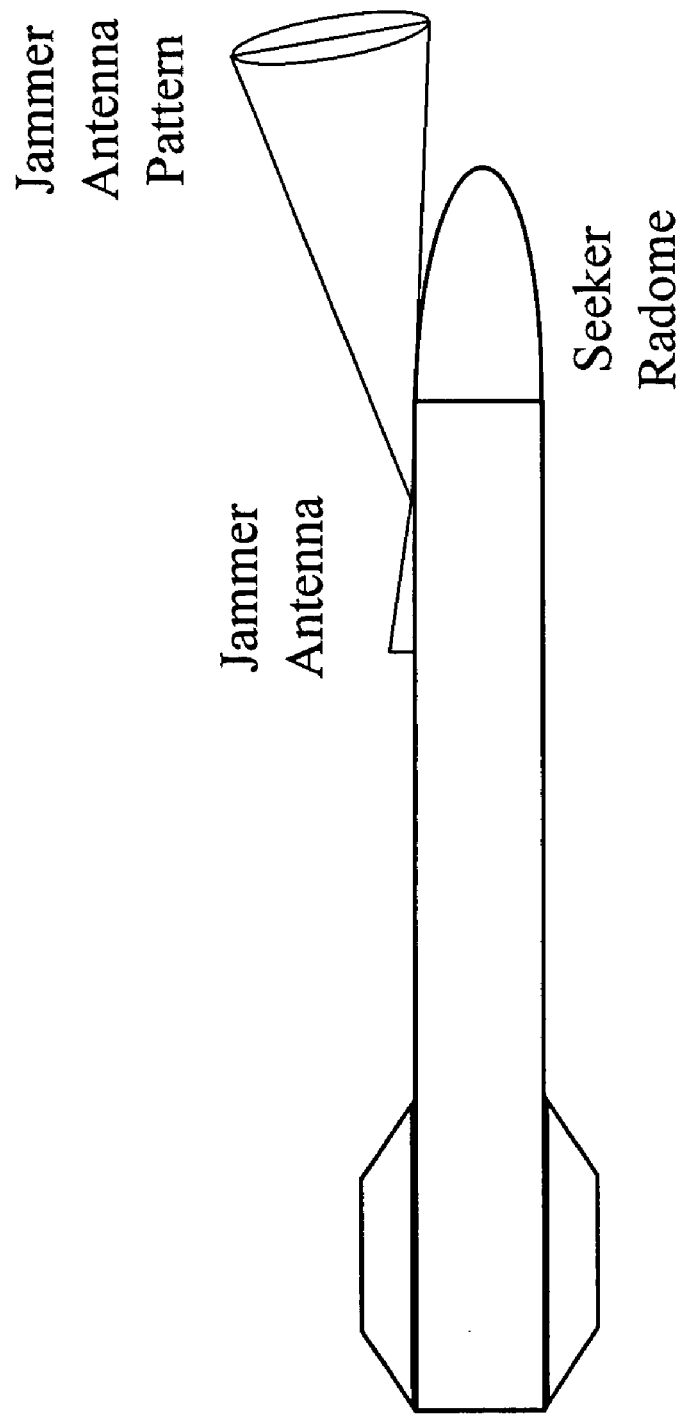
FIG. 3 illustrates the antenna pattern shadowing that can result from the use of a transmissive radome.
Figure 4:
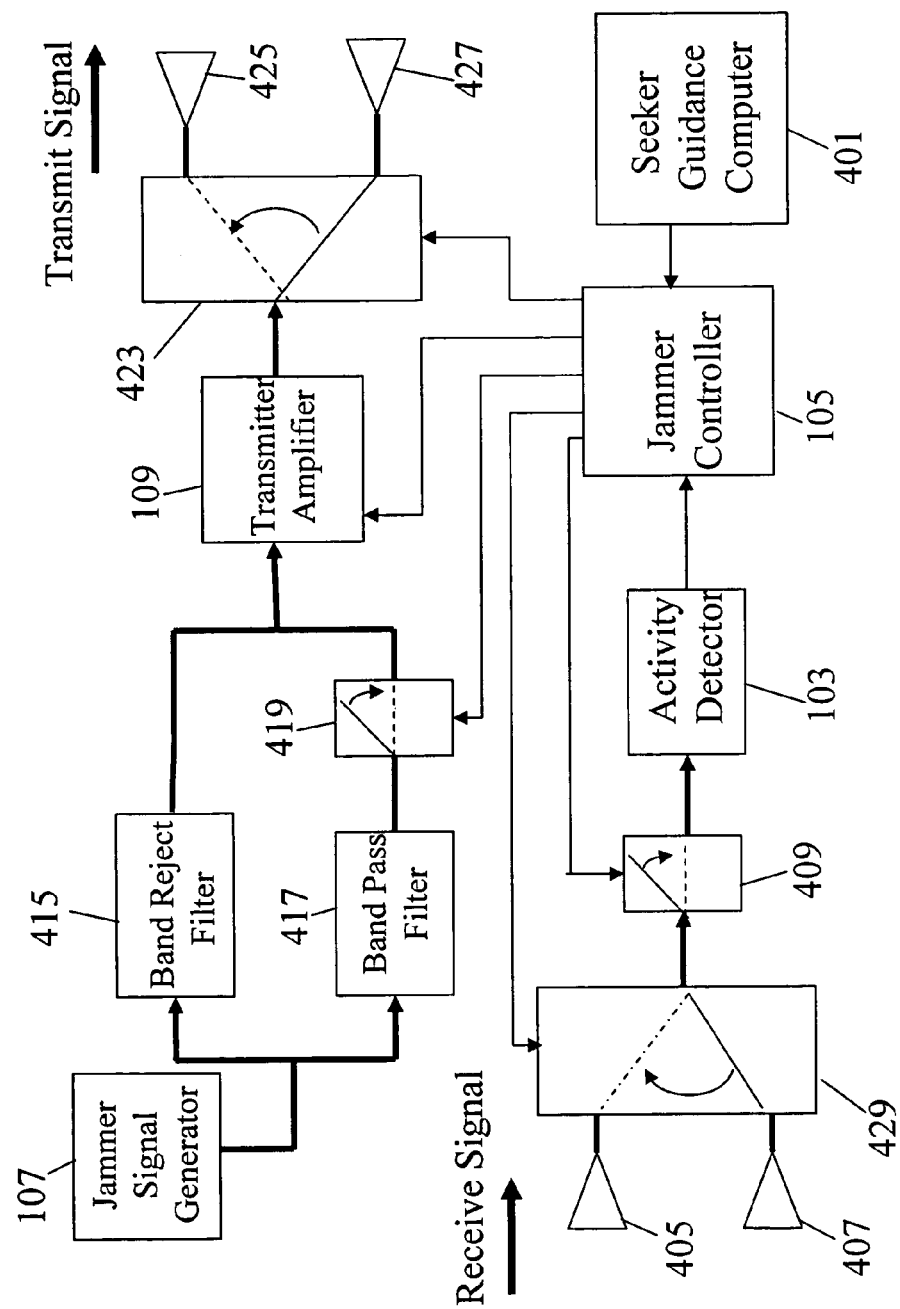
FIG. 4 is a diagram of a preferred embodiment of the Multiple-Antenna Jamming System typically deployed on a RF seeker missile and located between the seeker and the warhead.

Referring now to the drawing wherein like numbers represent like parts in each of the several figures and dark arrows indicate RF signal travel while light arrows indicate electronic command signals, the structure and function of the multiple-antenna jamming system (MAJS) are explained in detail. The MAJS system resides in a frequency seeker missile 201 and is located typically between the warhead and seeker portions of the missile. The MAJS utilizes seeker guidance computer 401 that already is a part of the seeker.

During the missile's flight toward the selected target, the guidance computer controls the pattern of the seeker pulses emitted toward the target, setting the frequency band of the emitted pulses and determining the duration of the listening period between two consecutive emitted pulses, and also generates information relative to the missile's line-of-sight to the target. Any active protection system (APS) that protects the target also emits pulses to detect any incoming missiles and destroy them. In MAJS, any such enemy radar emissions are detected by either of receiving antennas 405 or 407, these two receiving antennas being surface wave, conformal antennas located on opposite sides of the missile. The selection of the particular receiving antenna depends on which receiving antenna is best positioned to receive the enemy radar signals as determined by jammer controller 105 based on the line-of-sight information the controller receives from computer 401. During the listening phase, the jammer controller closes first receiving switch 409 (single-pole-single-throw) to provide a signal path between the selected receiving antenna and activity detector 103. Any signal received by the selected receiving antenna is coupled by second receiving switch 429 (single-pole-double-throw) to the activity detector via the first receiving switch. During the listening phase, antenna switching also occurs between the two receiving antennas to accommodate the changing line-of-sight information and to reduce the loss due to antenna shadowing.

Since these enemy radar emissions are received during the missile seeker's listen time (i.e. no seeker pulses are emitted), any detected signals are indicative of the presence of an active protection system that needs to be disabled to increase the effectiveness of the missile. Upon detection of an enemy radar, the jammer controller causes jamming signals to be transmitted from transmit antennas 425 or 427, also conformal antennas, located on opposite sides of the missile, the selection again depending on which is the best positioned transmit antenna given the line-of-sight information. The objective is to choose the particular transmit antenna with the lowest line-of-sight angle. This is illustrated in FIGS. 5A and 5B.

Figure 6:
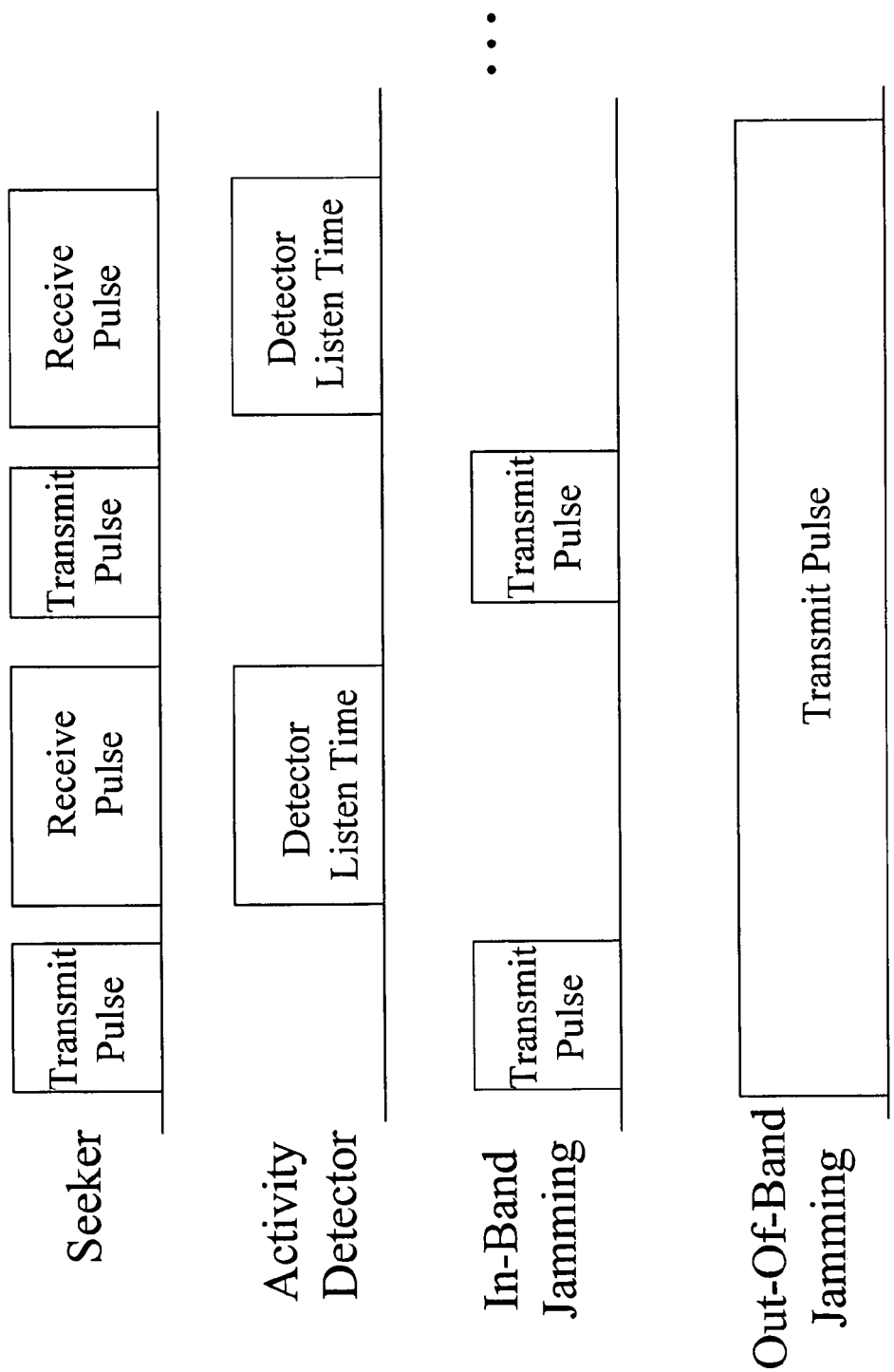
FIG. 6 is a diagram depicting the synchronization of the transmission of the jamming signals with the emission of seeker pulses toward the selected target.

Jammer signal generator 107 produces jammer signals that are biplexed by band reject filter 415 and band pass filter 417 into out-of-seeker-band signals and in-seeker-band signals, respectively. The out-of-seeker-band jamming signals are continuously transmitted for maximum effect, whereas the in-seeker-band jamming signals are transmitted periodically, in synchronization with the emission pattern of the seeker pulses, such that the in-seeker-band jamming signals are transmitted only when the seeker itself is transmitting. The in-seeker-band jamming signal is gated in first transmitting switch 419 that is, however, turned off during the seeker listen time. This "turn-off" prevents the in-seeker-band jamming signals from interfering with the seeker's listening capability. The synchronization is performed by jammer controller 105 in cooperation with computer 401 and is illustrated in FIG. 6.

The two channels of jamming signals are combined and provided to transmitter amplifier 109 that amplifies the jamming signals before they are applied to the selected transmit antenna for radiation. Throughout the jam mode, switching between the transmit antennas is performed by second transmit switch 423 under the direction from the jammer controller. The switching is based on the indicated line-of-sight angle output from the guidance computer and aims to minimize antenna shadowing loss.

Using oppositely-located antennas and synchronizing the radiation of jamming signals with the emission of the seeker pulses optimizes the jamming energy on the enemy radar at or around the seeker frequency band without interfering with the seeker operation.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A jamming system for jamming an enemy radar associated with a pre-selected target, said jamming system being resident on an air-borne weapon having a radio frequency seeker, and comprising: a guidance computer for controlling the pattern of radio frequency emission of said seeker, said pattern comprising an alternating sequence of emitting and listening, said computer further maintaining said seeker's line-of-sight to said target and said associated enemy radar; a means for detecting the presence of said enemy radar; a means for generating jamming signals; a means for transmitting said jamming signals; and a jammer controller coupled to receive said line-of-sight information and said seeker emission pattern from said computer, said jammer controller being further coupled concurrently to said detecting means, said generating means and said transmitting means, said controller, in response to said detecting means, causing said jamming signals to be transmitted from said transmitting means toward said enemy radar, said controller synchronizing the radiation of said jamming signals with said emission pattern of said seeker so as to achieve disablement of said enemy radar while offering no interference with said emission pattern of said seeker.

2. A jamming system as set forth in claim 1, wherein said detecting means comprises: a first receiving switch, said first receiving switch being coupled to said jammer controller so as to allow said controller selectively to close said first receiving switch to provide a signal path; at least a first receiving antenna and a second receiving antenna; a second receiving switch coupled concurrently between said receiving antennas, said first receiving switch and said controller, said controller selectively connecting said second receiving switch to either said first receiving antenna or said second receiving antenna so as to maximize signal reception, in response to said line-of-sight information received from said computer; and an activity detector coupled between said first receiving switch and said jammer controller, said detector determining the presence of said enemy radar from said received signals and inputting said determination to said controller.

3. A jamming system as set forth in claim 2, wherein said means for generating jamming signals comprises: a jammer signal generator for generating jamming signals; a diplexer coupled to receive said jamming signals from said generator, said diplexer separating said jamming signals into in-seeker-band signals and out-of-seeker-band signals; a first transmitting switch coupled to said jammer controller, said first transmitting switch transmitting said in-seeker-band jamming signals from time to time in response to synchronization from said controller such that said in-seeker-band jamming signals are transmitted only when said RF seeker is emitting.

4. A jamming system as set forth in claim 3, wherein said transmitting means comprises: at least a first transmitting antenna and a second transmitting antenna; a second transmitting switch coupled concurrently between said transmitting antennas, said diplexer and said controller, said controller selectively connecting said second transmitting switch to either said first transmitting antenna or said second transmitting antenna so as to maximize signal transmission to said enemy radar, in response to said line-of-sight information received from said computer.

5. A jamming system as set forth in claim 4, wherein said diplexer comprises: a band-reject filter and a band-pass filter, said band-pass filter being coupled to said first transmitting switch.

6. A jamming system as set forth in claim 5, wherein said transmitting means further comprises: an amplifier coupled concurrently between said band-reject filter, said first transmitting switch, said second transmitting switch and said jammer controller, said amplifier amplifying said jamming signals prior to transmission thereof.

7. A jamming system as set forth in claim 6, wherein said receiving and transmitting antennas are conformal antennas positioned on the outer surface of said air-borne weapon.

8. A jamming system as set forth in claim 7, wherein said first receiving and first transmitting antennas form an adjacently-positioned first pair of antennas and said second receiving and second transmitting antennas form an adjacently-positioned second pair of antennas, said first and second pairs being located on opposite sides of said weapon.

9. A jamming system as set forth in claim 8, wherein said out-of-seeker band jamming signals are continuously transmitted toward said enemy radar.

10. A jamming system as set forth in claim 9, wherein said first receiving switch and said first transmitting switch are single-pole-single-throw switches.

11. A jamming system as set forth in claim 10, wherein said second receiving switch and said second transmitting switch are single-pole-double-throw switches.

12. A jamming system for disabling an enemy radar positioned in a close proximity to a selected target, said jamming system being resident on an air-borne weapon having a radio frequency seeker and a computer for controlling the pattern of radio frequency emission of said seeker and for maintaining said seeker's line-of-sight to said target and said enemy radar, said jamming system comprising: a plurality of receiving antennas for receiving any emission signals from said enemy radar; a means for determining the presence of said enemy radar, said determining means being coupled to said receiving antennas; a source of jamming signals; a plurality of transmitting antennas, said antennas being positioned relative to each other so as to minimize antenna pattern shadowing; and a jammer controller coupled to receive said line-of-sight information and said seeker emission pattern from said computer, said jammer controller being further coupled concurrently to said determining means, said source and said transmitting antennas, said controller having therein a means for synchronizing the transmission of said jamming signals so as to maximize the disablement of said enemy radar while offering no interference with said emission pattern of said seeker.

13. A jamming system for disabling an enemy radar as set forth in claim 12, wherein said source generates in-seeker-band jamming signals and out-of-seeker-band jamming signals.

14. A jamming system for disabling an enemy radar as set forth in claim 13, wherein said synchronizing means cooperates with said determining means and said computer, said cooperation enabling said synchronizing means to cause said transmitting antennas to transmit said in-seeker-band jamming signals only when said RF seeker is emitting.

15. A jamming system for disabling an enemy radar as set forth in claim 14, wherein said jamming controller selectively activates one of said receiving antennas and one of said transmitting antennas, said selective activation aiming to achieve maximum efficiency in signal reception and transmission and being driven by said line-of-sight information received by said controller from said computer.

* * * * *